(12) United States Patent
Zhang et al.

(10) Patent No.: US 10,589,707 B2
(45) Date of Patent: Mar. 17, 2020

(54) AIRBAG APPARATUS

(71) Applicant: TOYODA GOSEI CO., LTD., Kiyosu-shi, Aichi-ken (JP)

(72) Inventors: Ning Zhang, Beverly Hills, MI (US); Shiro Ohara, Ypsilanti, MI (US); Aviral Shrivatri, Livonia, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 115 days.

(21) Appl. No.: 15/886,886

(22) Filed: Feb. 2, 2018

(65) Prior Publication Data

US 2019/0241142 A1 Aug. 8, 2019

(51) Int. Cl.
| | |
|---|---|
| *B60R 21/203* | (2006.01) |
| *B60R 21/2338* | (2011.01) |
| *B60R 21/233* | (2006.01) |
| *B60R 21/231* | (2011.01) |
| *B60R 21/00* | (2006.01) |

(52) U.S. Cl.
CPC ........ *B60R 21/2035* (2013.01); *B60R 21/233* (2013.01); *B60R 21/2338* (2013.01); *B60R 2021/0048* (2013.01); *B60R 2021/23107* (2013.01); *B60R 2021/23324* (2013.01)

(58) Field of Classification Search
CPC . B60R 21/203; B60R 21/2035; B60R 21/233; B60R 21/2338; B60R 2021/0048; B60R 2021/23107; B60R 2021/23308; B60R 2021/23316; B60R 2021/23324; B60R 2021/23382

See application file for complete search history.

(56) References Cited

U.S. PATENT DOCUMENTS

| | | | | |
|---|---|---|---|---|
| 3,642,303 | A | * | 2/1972 | Irish .................. B60R 21/233 280/730.1 |
| 5,358,273 | A | * | 10/1994 | Onishi ................ B60R 21/233 280/729 |
| 5,529,337 | A | * | 6/1996 | Takeda ................ B60R 21/233 280/729 |

(Continued)

FOREIGN PATENT DOCUMENTS

| | | |
|---|---|---|
| EP | 2 033 850 A2 | 3/2009 |
| JP | 2008179173 A * | 8/2008 |

(Continued)

*Primary Examiner* — Laura Freedman
(74) *Attorney, Agent, or Firm* — Posz Law Group, PLC

(57) ABSTRACT

An airbag apparatus includes an airbag and an inflator. The airbag is configured to be deployed and inflated by the inflation gas at a position forward of a vehicle seat. The airbag includes a main bag member, an auxiliary bag member, and a tether. The main bag member is configured to be attached to a base member located at a position forward of the vehicle seat in the vehicle. The inflation gas is supplied from the inflator to the main bag member. The auxiliary bag member has a smaller volume than the main bag member and projects rearward from the main bag member. The tether extends across a boundary portion between the main bag member and the auxiliary bag member. A communicating portion, which allows communication between the main bag member and the auxiliary bag member, is provided around the tether in the boundary portion.

4 Claims, 9 Drawing Sheets

(56) References Cited

U.S. PATENT DOCUMENTS

| | | | |
|---|---|---|---|
| 5,577,765 A * | 11/1996 | Takeda | B60R 21/233 280/729 |
| 6,419,267 B1 * | 7/2002 | Hashimoto | B60R 21/233 280/729 |
| 6,439,605 B2 * | 8/2002 | Ariyoshi | B60R 21/233 280/739 |
| 6,464,249 B1 * | 10/2002 | Lacroix | B60R 21/233 280/729 |
| 6,471,244 B1 * | 10/2002 | Nishijima | B60R 21/233 280/729 |
| 6,554,313 B2 * | 4/2003 | Uchida | B60R 21/233 280/729 |
| 6,626,459 B2 * | 9/2003 | Takimoto | B60R 21/2035 280/731 |
| 6,786,505 B2 * | 9/2004 | Yoshida | B60R 21/233 280/729 |
| 6,916,039 B2 * | 7/2005 | Abe | B60R 21/206 280/729 |
| 6,971,664 B2 * | 12/2005 | Amamori | B60R 21/231 280/729 |
| 6,971,666 B2 * | 12/2005 | Akiyama | B60R 21/231 280/729 |
| 7,210,701 B2 * | 5/2007 | Meissner | B60R 21/231 280/729 |
| 7,631,891 B2 * | 12/2009 | Washino | B60R 21/203 280/731 |
| 9,187,055 B1 * | 11/2015 | Genthikatti | B60R 21/2338 |
| 9,358,945 B2 * | 6/2016 | Yamada | B60R 21/233 |
| 9,428,139 B2 * | 8/2016 | Yamada | B60R 21/233 |
| 9,446,735 B1 * | 9/2016 | Jayasuriya | B60R 21/232 |
| 9,550,465 B1 * | 1/2017 | El-Jawahri | B60R 21/01512 |
| 9,650,011 B1 * | 5/2017 | Belwafa | B60R 21/233 |
| 9,676,355 B2 * | 6/2017 | Kruse | B60R 21/0136 |
| 9,738,243 B2 * | 8/2017 | Fukawatase | B60R 21/2338 |
| 9,758,123 B2 * | 9/2017 | Yamada | B60R 21/2338 |
| 9,821,751 B2 * | 11/2017 | Pendse | B60R 21/233 |
| 9,845,067 B2 * | 12/2017 | Morris | B60R 21/233 |
| 10,029,643 B2 * | 7/2018 | Spahn | B60R 21/205 |
| 10,266,145 B2 * | 4/2019 | Paxton | B60R 21/214 |
| 10,279,769 B2 * | 5/2019 | Nakanishi | B60R 21/203 |
| 10,315,610 B2 * | 6/2019 | Moritani | B60R 21/233 |
| 2006/0163848 A1 * | 7/2006 | Abe | B60R 21/231 280/729 |
| 2006/0197320 A1 * | 9/2006 | Abe | B60R 21/233 280/729 |
| 2017/0120854 A1 * | 5/2017 | Fukawatase | B60R 21/2035 |
| 2017/0166159 A1 * | 6/2017 | Shin | B60R 21/2176 |
| 2018/0361978 A1 * | 12/2018 | Belwafa | B60R 21/233 |
| 2018/0370479 A1 * | 12/2018 | Ishiguro | B60R 21/233 |
| 2019/0009745 A1 * | 1/2019 | Hikida | B60R 21/233 |
| 2019/0061674 A1 * | 2/2019 | Ishiguro | B60R 21/2338 |

FOREIGN PATENT DOCUMENTS

| | | | |
|---|---|---|---|
| JP | 2016-055681 A | | 4/2016 |
| JP | 2017065341 A | * | 4/2017 |
| JP | 2017-109684 A | | 6/2017 |

* cited by examiner

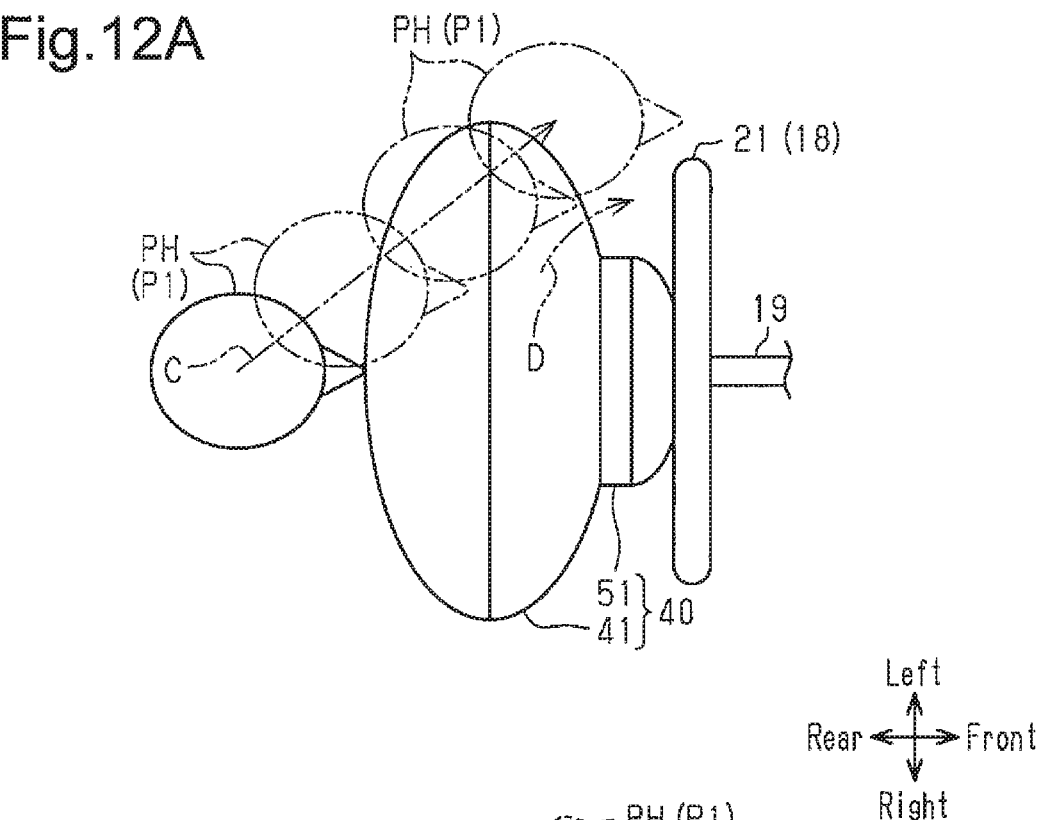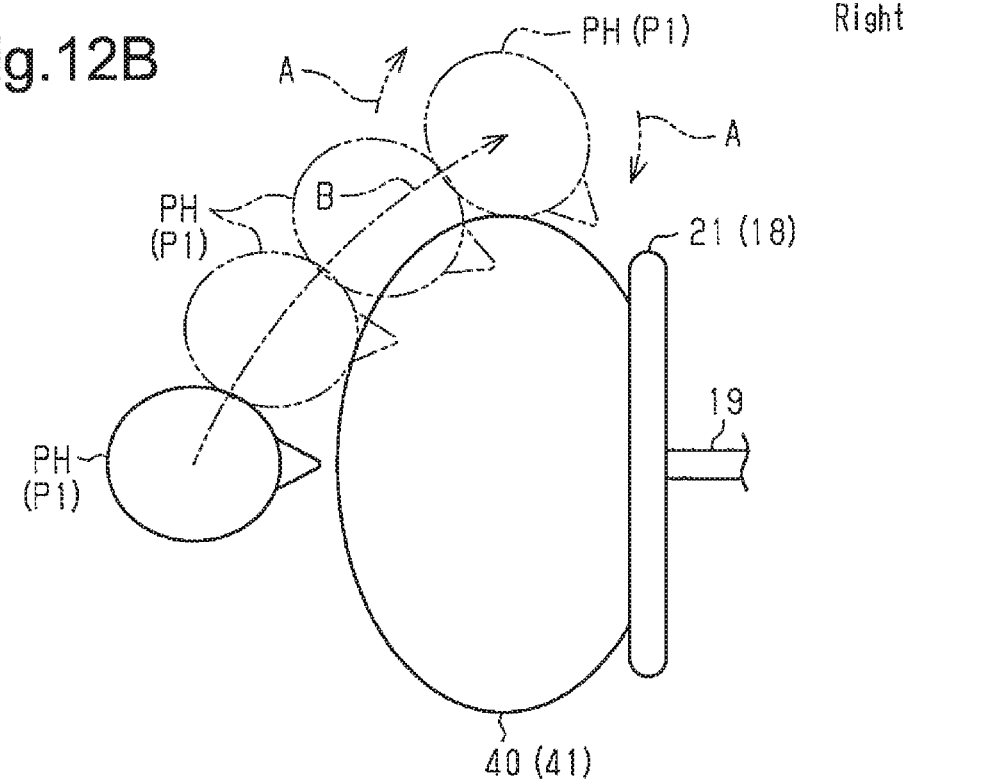

AIRBAG APPARATUS

BACKGROUND OF THE INVENTION

The present invention relates to an airbag apparatus that, when the impact of a crash or the like is applied to the front section of a vehicle, deploys and inflates an airbag at a position forward of the occupant seated on a vehicle seat and thus protects the occupant.

An airbag apparatus is effective as a device for protecting an occupant of a vehicle from the impact of a crash or the like that is applied to the front section of the vehicle.

For example, an airbag apparatus described in Japanese Laid-Open Patent Publication No. 2017-109684 includes an airbag and an inflator, which supplies inflation gas to the airbag in response to an impact applied to the front section of a vehicle. The airbag is deployed and inflated by the inflation gas at a position forward of a vehicle seat. The airbag includes a main bag member and an auxiliary bag member, which has a smaller volume than the main bag member. The main bag member is attached to the steering wheel together with the inflator. The auxiliary bag member is arranged on the rear side of the main bag member and communicates with the main bag member through a communicating portion.

When an impact is applied to the front section of the vehicle from forward or diagonally forward, the body of the occupant acts to lean to the side from which the impact has been applied due to the inertia. Meanwhile, in the airbag apparatus, the inflation gas is supplied from the inflator to the main bag member in response to the impact, which deploys and inflates the main bag member rearward. Some of the inflation gas that has been supplied to the main bag member passes through the communicating portion and is supplied to the auxiliary bag member. This deploys and inflates the auxiliary bag member rearward.

In the initial stage of deployment and inflation of the airbag, the auxiliary bag member, which has a smaller volume than the main bag member, projects rearward from the main bag member. The head of the occupant thus comes into contact with the auxiliary bag member at an earlier time than the thorax of the occupant comes into contact with the main bag member. Through such contact, the auxiliary bag member receives a load from the head and produces a reactive force that acts rearward, thus restraining and protecting the head. On the other hand, the main bag member receives load either indirectly through the auxiliary bag member or directly from the thorax. By receiving a load in these manners, the main bag member also produces a reactive force that acts rearward, thus restraining and protecting the thorax. As a result, unlike an airbag that lacks an auxiliary bag member and is configured simply by a main bag member, intense pressing of the thorax by the airbag at an earlier time than that of the head is avoided.

However, in the airbag apparatus described in the aforementioned document, arranging the communicating portion decreases the tensile force of the main bag member. This correspondingly decreases the reactive force produced by the main bag member, which receives load through the auxiliary bag member. The main bag member is thus deformed in a manner crushing forward after the auxiliary bag member is deformed. There is thus room for improvement in the protection of the head by the main bag member after deformation of the auxiliary bag member.

SUMMARY OF THE INVENTION

Accordingly, it is an objective of the present invention to provide an airbag apparatus that is capable of improving protection performance of an airbag for the head of an occupant of a vehicle.

To achieve the foregoing objective, an airbag apparatus is provided that includes an airbag and an inflator, which supplies inflation gas to the airbag in response to an impact applied to a front section of a vehicle. The airbag is configured to be deployed and inflated by the inflation gas at a position forward of a vehicle seat. The airbag includes main bag member, an auxiliary bag member, and a tether. The main bag member is configured to be attached to a base member located at a position forward of the vehicle seat in the vehicle. The inflation gas is supplied from the inflator to the main bag member. The auxiliary bag member has a smaller volume than the main bag member and projects rearward from the main bag member. The tether extends across a boundary portion between the main bag member and the auxiliary bag member. A communicating portion, which allows communication between the main bag member and the auxiliary bag member, is provided around the tether in the boundary portion.

To achieve the foregoing objective, another airbag apparatus is provided that includes an airbag and an inflator, which supplies inflation gas to the airbag in response to an impact applied to a front section of a vehicle. The airbag is configured to be deployed and inflated by the inflation gas at a position forward of a vehicle seat. The airbag includes a main bag member and an auxiliary bag member, which has a smaller volume than the main bag member and projects forward from the main bag member. The auxiliary bag member is configured to be attached to a base member located at a position forward of the vehicle seat in the vehicle. The inflation gas is supplied from the inflator to the auxiliary bag member. A communicating portion, which allows communication between the main bag member and the auxiliary bag member, is provided in a boundary portion between the main bag member and the auxiliary bag member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12A is a schematic diagram illustrating the operation at the time impact is applied to the front section of a vehicle from diagonally forward and the movements of the airbag of the second embodiment and the head of the occupant;

FIG. 12B is a schematic diagram illustrating the operation at the time impact is applied to the front section of a vehicle from diagonally forward and an airbag of a comparative example and the movement of the head of an occupant;

DETAILED DESCRIPTION OF THE PREFERRED EMBODIMENTS

First Embodiment

An airbag apparatus for a vehicle driver's seat according to a first embodiment will now be described with reference to FIGS. 1 to 7C.

In the following description, the direction in which the vehicle advances will be referred to as the front, and the reverse direction will be referred to as the rear. The up-down direction refers to the up-down direction of the vehicle, and the left-right direction refers to the width direction of the vehicle (vehicle width direction) that matches with the left-right direction when the vehicle is advancing forward. It is now assumed that an occupant having a size equivalent to a crash test dummy is seated on the vehicle seat.

Figure 1:
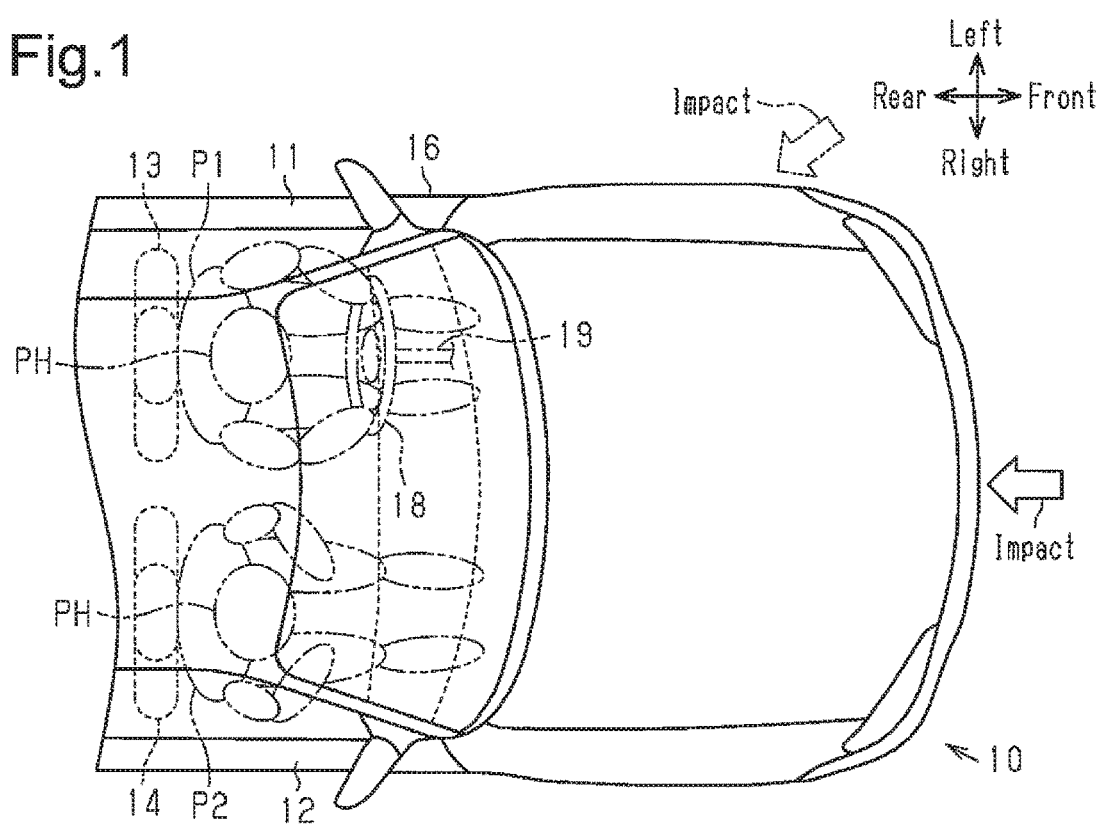
FIG. 1 is a partial plan view showing a vehicle equipped with an airbag apparatus for a driver's seat according to a first embodiment.

As shown in FIG. 1, the opposite sides of a vehicle 10 in the vehicle width direction are configured by side wall portions 11, 12, each of which includes doors and pillars. In the front section of the passenger compartment of the vehicle 10, two vehicle seats 13, 14 are arranged as the front seats to be aligned in the vehicle width direction. The vehicle seat 13, which is adjacent to the side wall portion 11, functions as the driver's seat and an occupant P1 is seated on the vehicle seat 13. The vehicle seat 14, which is adjacent to the side wall portion 12, functions as the front passenger seat and an occupant P2 is seated on the vehicle seat 14. The vehicle seats 13, 14 are configured identically with each other.

Figure 2:
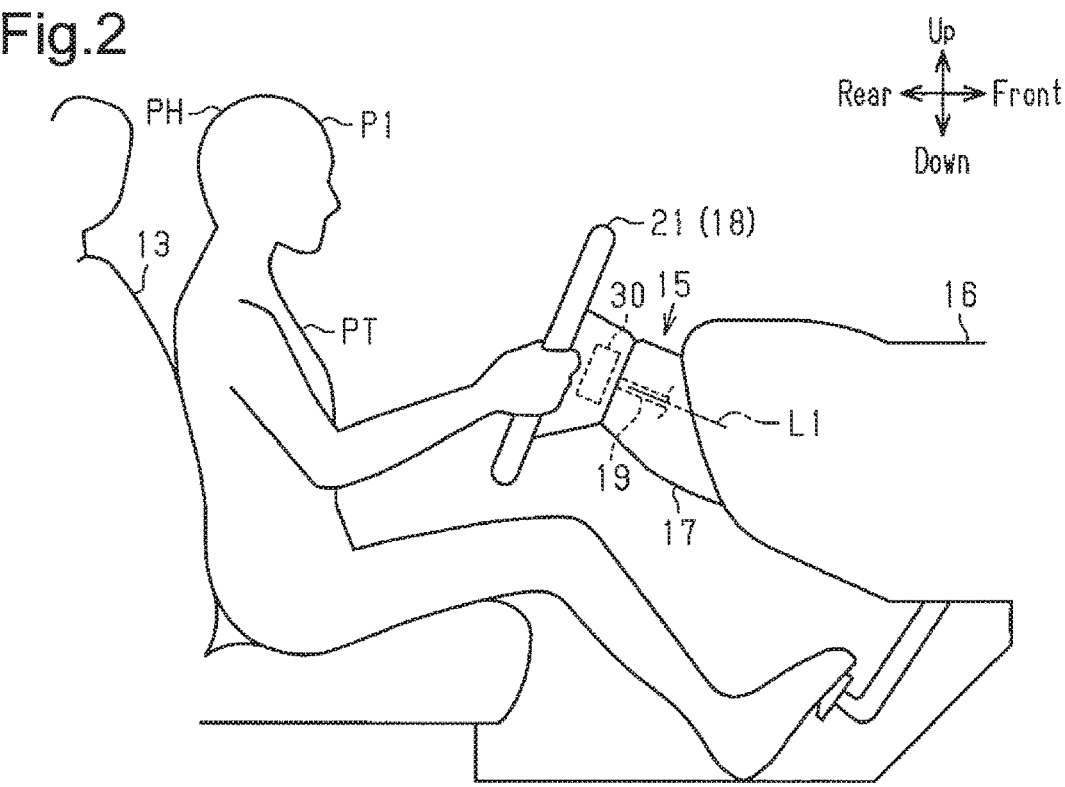
FIG. 2 is a side view schematically showing a steering wheel equipped with the airbag apparatus according to the first embodiment and the vicinity of the steering wheel.

As shown in FIG. 2, a steering device 15, which is manipulated by the occupant P1 to steer the vehicle 10, is arranged at a position forward of the vehicle seat 13. The steering device 15 includes a steering column 17, which is fixed to a vehicle body 16, and a steering wheel 18, which is rotationally arranged on the rear side of the steering column 17. A steering shaft 19, which transmits rotation of the steering wheel 18 to the steering gear box (not shown), is arranged in the steering column 17. The steering shaft 19 is arranged in a state inclined to be higher toward the rear end. The steering wheel 18 is attached to the rear end of the steering shaft 19.

Figure 3:
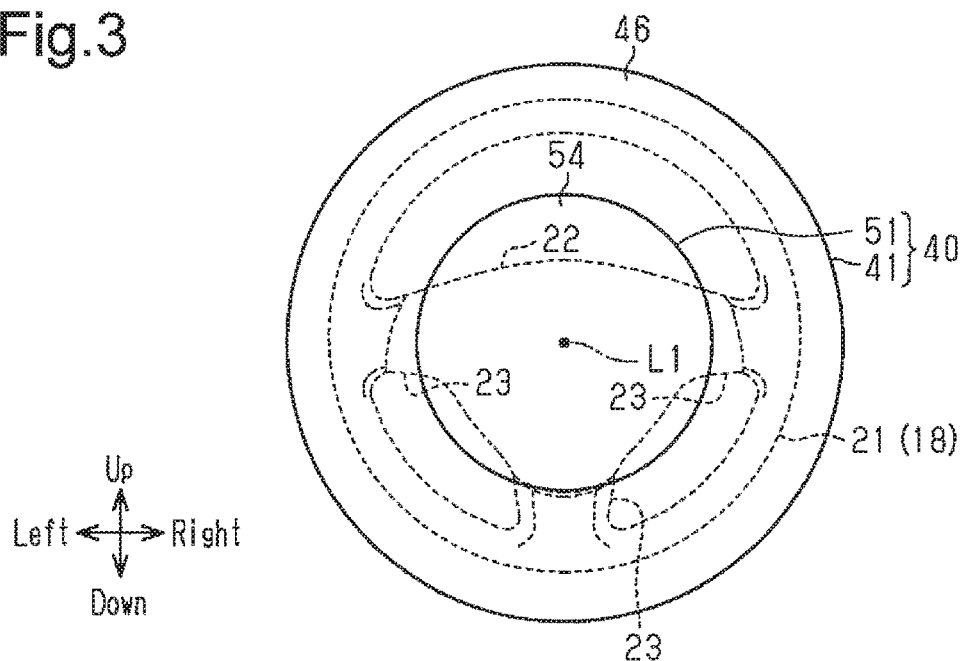
FIG. 3 is a front view showing an airbag of the first embodiment together with the steering wheel.

As shown in FIG. 3, the steering wheel 18 includes a ring portion 21, a pad portion 22, and spoke portions 23. The ring portion 21 is referred to also as a wheel portion or a rim portion. The ring portion 21 is a portion that is gripped and rotated by the occupant P1 and substantially has an annular shape about the axis L1 of the steering shaft 19.

The pad portion 22 is arranged in the space surrounded by the ring portion 21. The spoke portions 23 each connect the ring portion 21 to the pad portion 22.

Figure 6:
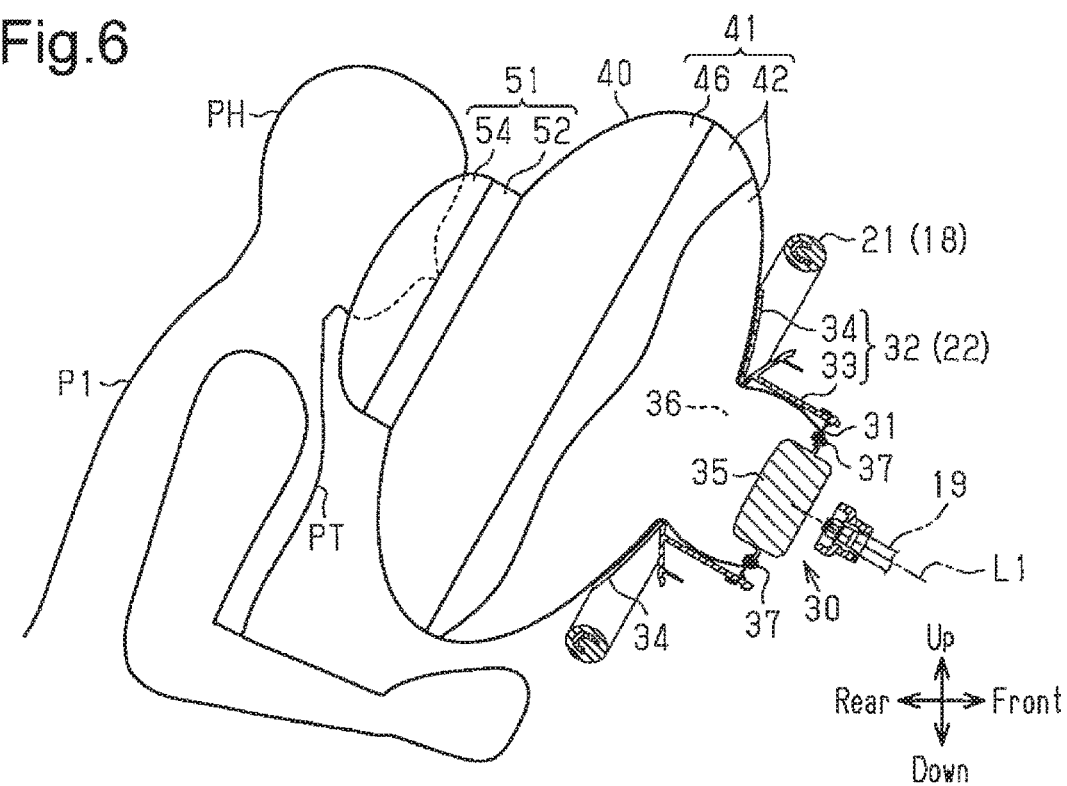
FIG. 6 is a partial cross-sectional view illustrating a manner in which the occupant is restrained by the airbag of the first embodiment.

As shown in FIGS. 2 and 6, the steering wheel 18 is equipped with an airbag apparatus 30 for a driver's seat. The airbag apparatus 30 for a driver's seat includes a bag holder 31, an airbag cover 32, an inflator (a gas generator) 35, and an airbag 40.

The bag holder 31 is supported by the steering wheel 18 and configures a base member to which the inflator 35 and the airbag 40 are attached. The inflator 35 and the airbag 40 are attached to the steering wheel 18 with the bag holder 31 in between.

The airbag cover 32 is configured by part of the pad portion 22. The airbag cover 32 includes an accommodating wall portion 33 and a door portion 34. The accommodating wall portion 33 has a tubular shape and surrounds the inflator 35 and the airbag 40, which is folded in a compact form. The accommodating wall portion 33 is attached to the bag holder 31 at the front end of the accommodating wall portion 33. The door portion 34 is arranged at the rear end of the accommodating wall portion 33.

The airbag 40 includes a main bag member 41 and an auxiliary bag member 51, which has a smaller volume than the main bag member 41 and projects rearward from the main bag member 41.

Figure 4:
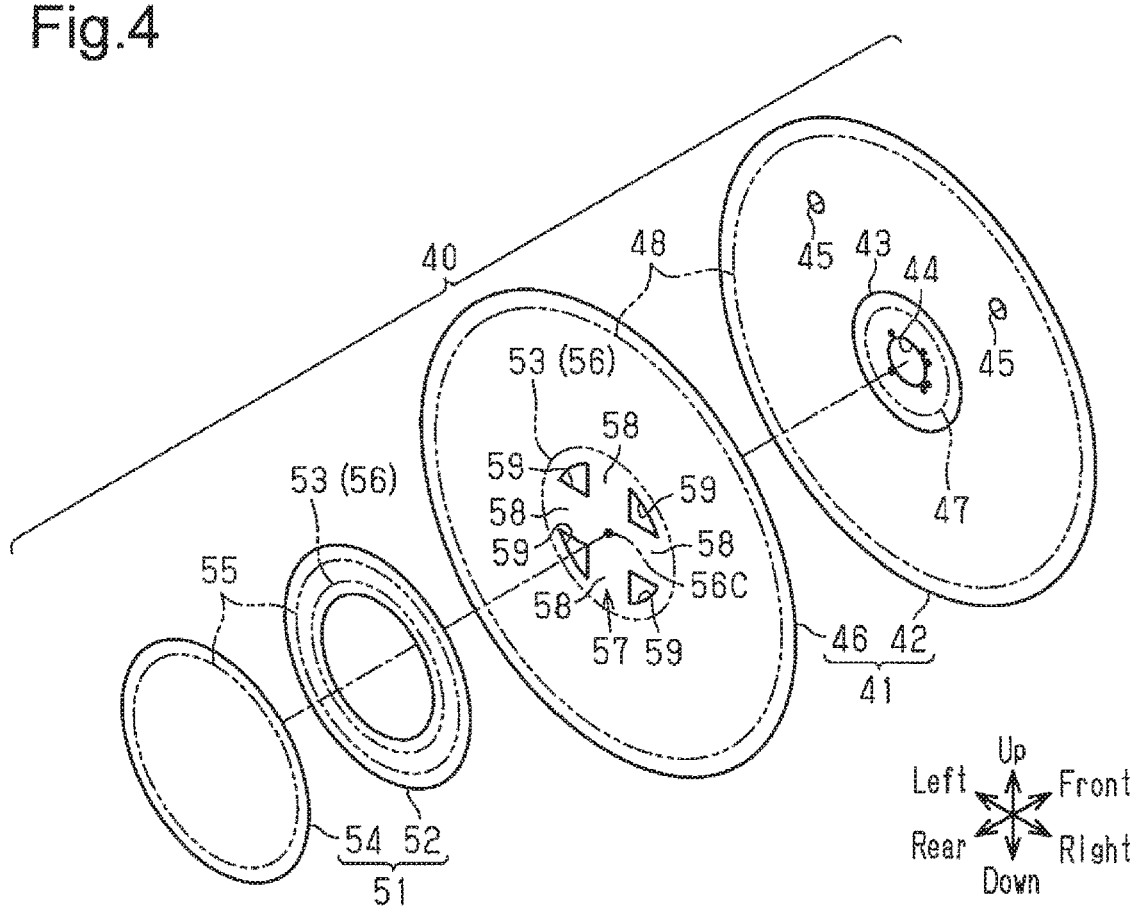
FIG. 4 is an exploded perspective view showing components of the airbag of the first embodiment.
Figure 5:
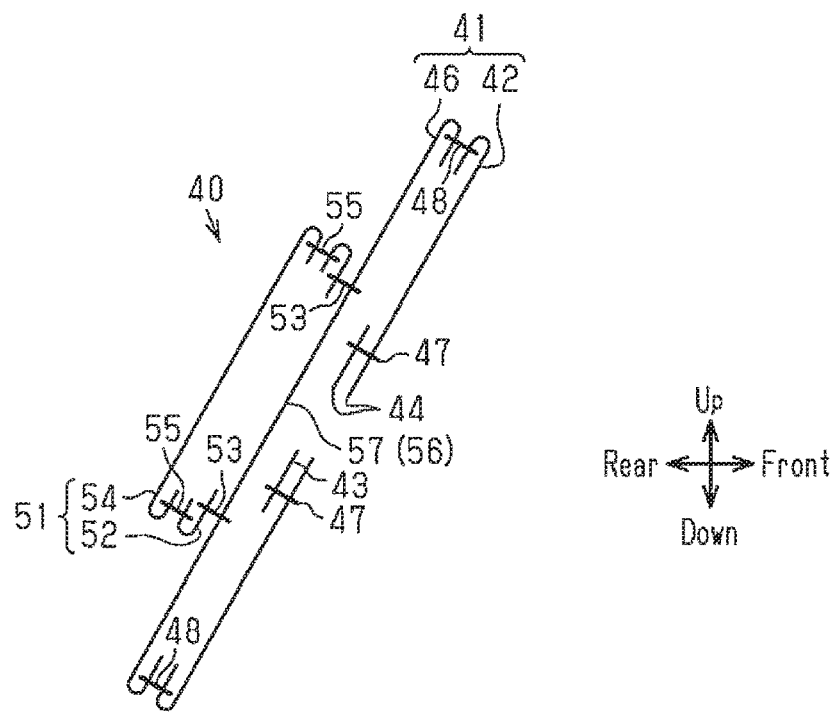
FIG. 5 is a cross-sectional view showing the airbag of the first embodiment.

As shown in FIGS. 4 to 6, the main bag member 41 substantially has a disk-like shape and includes a front main panel 42 and a rear main panel 46, which have substantially equal outer diameters. A reinforcement fabric piece 43, which has an outer diameter smaller than that of the front main panel 42, is stacked on the central section of the rear surface of the front main panel 42. Insertion holes 44 are formed in the central section of the front main panel 42 and the central section of the reinforcement fabric piece 43. The reinforcement fabric piece 43 is joined to the front main panel 42 by a peripheral edge joint portion 47, which is arranged along the outer peripheral portion of the reinforcement fabric piece 43. The peripheral edge joint portion 47 is formed by sewing the reinforcement fabric piece 43 and the front main panel 42 together. Sewing is also employed to join other peripheral edge joint portions 48, 53, 55, 65, 68, 72, which will be discussed below.

The inflator 35 is inserted through the insertion holes 44. Fasteners 37, such as bolts and nuts, fasten the front main panel 42, the reinforcement fabric piece 43, and the inflator 35 to the bag holder 31. That is, the front main panel 42, the reinforcement fabric piece 43, and the inflator 35 are attached to the steering wheel 18 with the bag holder 31 in between. The front main panel 42 has vent holes 45, through which excess inflation gas is discharged to the exterior of the airbag 40 after the airbag 40 is fully deployed and inflated.

The rear main panel 46 is arranged on the rear side of the front main panel 42. The front main panel 42 and the rear main panel 46 are joined to each other by the peripheral edge joint portion 48, which is arranged along the outer peripheral portion of the front main panel 42 and the outer peripheral portion of the rear main panel 46. Such joining is carried out such that the joined section (the sewn section) is located inside the main bag member 41.

The auxiliary bag member 51 includes a front auxiliary panel 52 and a rear auxiliary panel 54. The front auxiliary panel 52 has an annular shape and is arranged on the rear side of the rear main panel 46. The front auxiliary panel 52 is joined to the rear main panel 46 by the peripheral edge joint portion 53, which is arranged along the inner peripheral portion of the front auxiliary panel 52. Such joining is carried out such that the joined section (the sewn section) is located inside the airbag 40.

The rear auxiliary panel 54 is formed into a disk-like shape having an outer diameter substantially equal to the outer diameter of the front auxiliary panel 52 and is arranged on the rear side of the front auxiliary panel 52. The rear auxiliary panel 54 is joined to the outer peripheral portion of the front auxiliary panel 52 by the peripheral edge joint portion 55, which is arranged along the outer peripheral portion of the rear auxiliary panel 54.

The joining by the peripheral edge joint portions 53, 55 is carried out on the same surface of the front auxiliary panel 52 with the front auxiliary panel 52 stacked on the rear main panel 46 and the rear auxiliary panel 54. Further, the joining by the peripheral edge joint portion 55 is carried out such that the joined section (the sewn section) is located inside the auxiliary bag member 51.

The area on the rear main panel 46 and the area on the front auxiliary panel 52 that are surrounded by the peripheral edge joint portion 53 configure a boundary portion 56 between the main bag member 41 and the auxiliary bag member 51. A tether 57 extends across the boundary portion 56. Communicating portions 59, which allow communication between the main bag member 41 and the auxiliary bag member 51, are formed at multiple positions in the periphery of the tether 57 in the boundary portion 56.

The tether 57 includes four strips 58, which extend radially from a central section 56C to the outer peripheral section of the boundary portion 56, and is formed integrally with the rear main panel 46. Circumferentially adjacent ones of the strips 58 cross each other at a right angle. In the first embodiment, two of the four strips 58 extend in the up-down direction and the other two extend in the left-right direction. Each of the communicating portions 59 is formed between the corresponding circumferentially adjacent ones of the strips 58.

The front main panel 42, the reinforcement fabric piece 43, the rear main panel 46 including the tether 57, the front auxiliary panel 52, and the rear auxiliary panel 54, which have been described, are all made of a high-strength and flexible material, which can be easily folded. Such material may be woven fabric formed using polyester thread or polyamide thread.

The operation and advantages of the airbag apparatus 30 for a driver's seat according to the first embodiment, which is configured as described above, will now be described.

When the impact of a crash or the like is applied to the front section of the vehicle 10 from forward as represented by the solid arrow in FIG. 1, the upper half of the body of each of the occupants P1, P2 acts to lean forward due to the inertia.

Meanwhile, in the airbag apparatus 30 for a driver's seat, as shown in FIGS. 5 and 6, the inflation gas is supplied from the inflator 35 to the main bag member 41 in response to the aforementioned impact. Deployment and inflation of the main bag member 41 are thus started. Some of the inflation gas that has been supplied to the main bag member 41 passes through the communicating portions 59 and is supplied to the auxiliary bag member 51. This starts deployment and inflation of the auxiliary bag member 51 with a delay with respect to the main bag member 41. Such deployment and inflation cause a tense state of each of the main bag member 41 and the auxiliary bag member 51. The main bag member 41 and the auxiliary bag member 51, which are deployed and inflated in the above-described manners, apply pressing force to and open the door portion 34, thus forming an opening 36 in the airbag cover 32. The main bag member 41 and the auxiliary bag member 51 are continuously deployed and inflated to extend to the exterior of the accommodating wall portion 33 through the opening 36.

When outside the accommodating wall portion 33, the main bag member 41 is deployed and inflated rearward. The auxiliary bag member 51 is deployed and inflated rearward toward the head PH of the occupant P1, which acts to lean forward.

Figure 7A:
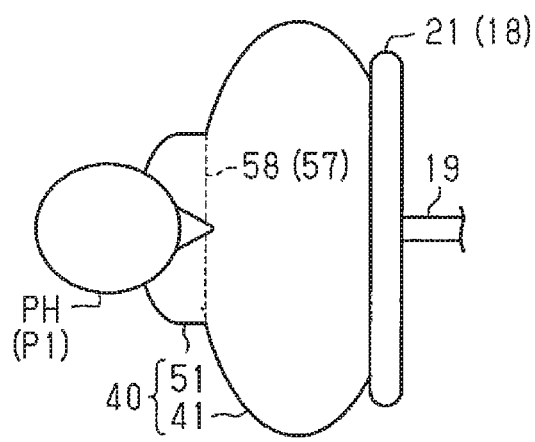
FIGS. 7A and 7B are schematic plan views illustrating the manner in which the occupant is restrained by the airbag of the first embodiment.

Specifically, in the first embodiment, as shown in FIGS. 6 and 7A, the auxiliary bag member 51, which has a smaller volume than the main bag member 41, projects rearward from the main bag member 41. The head PH of the occupant P1 thus comes into contact with the auxiliary bag member 51 at an earlier time than the thorax PT comes into contact with the main bag member 41. By receiving the load of the head PH, the auxiliary bag member 51 is switched to a tenser state and thus produces a reactive force that acts rearward. On the other hand, the main bag member 41 receives load either indirectly through the auxiliary bag member 51 or directly from the thorax PT. By receiving a load in these manners, the main bag member 41 is also switched to a tenser state and thus produces a reactive force that acts rearward.

In the initial stage of deployment and inflation of the airbag 40, the head PH is restrained by the auxiliary bag member 51, which produces reactive force as has been described. However, since the volume of the auxiliary bag member 51 is smaller than the volume of the main bag member 41, the reactive force produced by the auxiliary bag member 51 is smaller than the reactive force produced by the main bag member 41. As a result, as shown in FIG. 7B, the auxiliary bag member 51 acts to be greatly deformed when receiving the load of the head PH of the occupant P1.

Figure 7B:
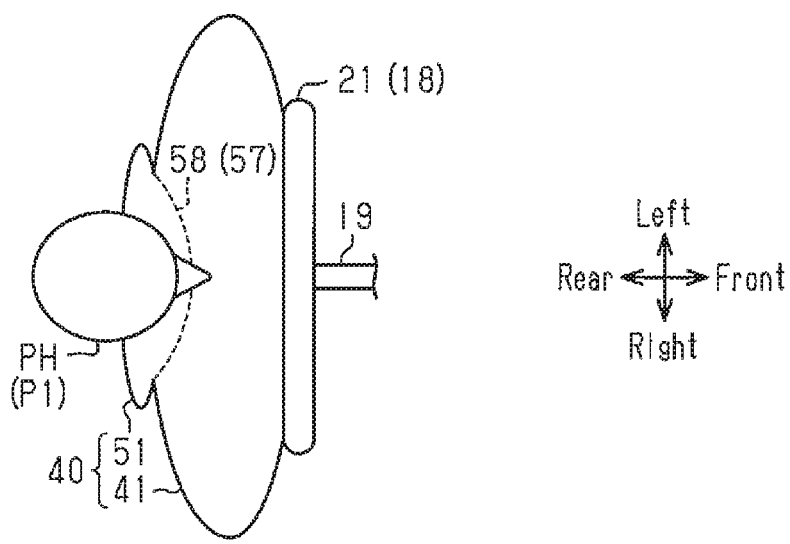
Figure 7C:
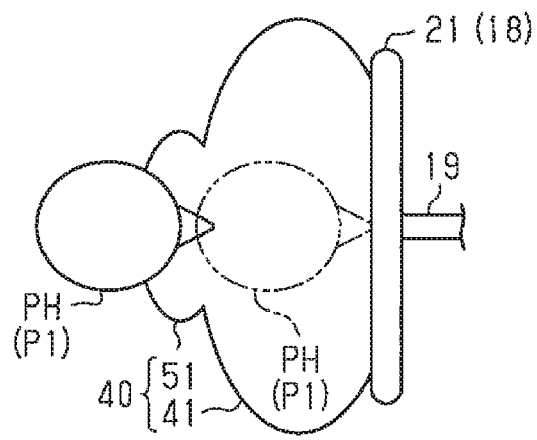
FIG. 7C is a schematic plan view illustrating a manner in which the occupant is restrained by an airbag of a comparative example.
Figure 8:
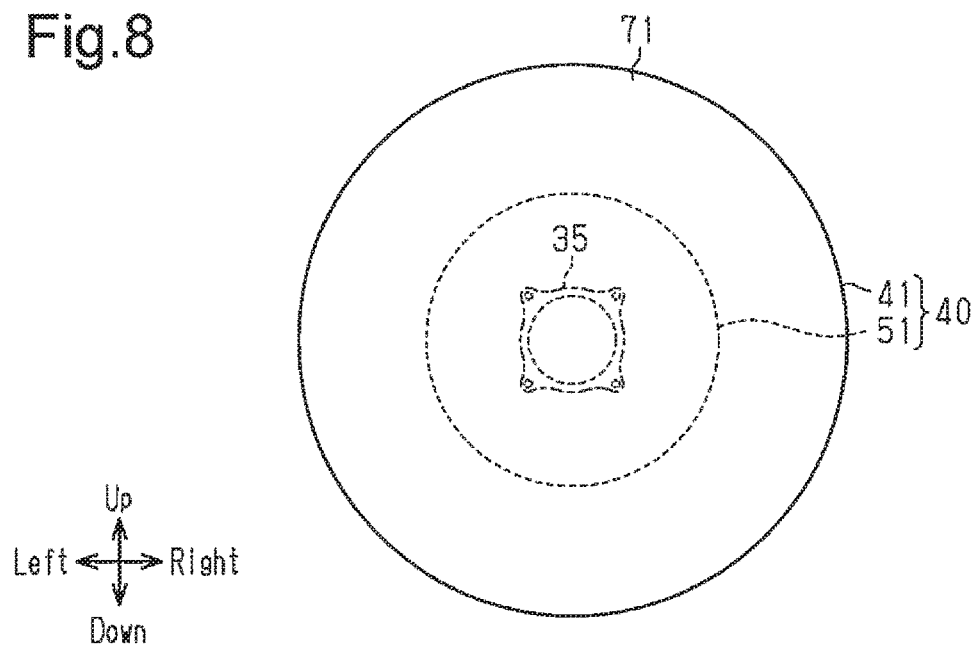
FIG. 8 is a front view showing an airbag and an inflator, illustrating an airbag apparatus for a driver's seat according to a second embodiment.

FIG. 7C illustrates a comparative example in which a communicating portion is not provided with a tether extending across the boundary portion between the main bag member 41 and the auxiliary bag member 51. In this case, the tensile force of the main bag member 41 is small. This correspondingly decreases the reactive force that is produced by the main bag member 41 when the main bag member 41 receives load through the auxiliary bag member 51. As a result, after the deformation of the auxiliary bag member 51, the main bag member 41 also becomes deformed in a manner crushing forward and the head PH moves excessively forward as represented by the long dashed double-short dashed lines in FIG. 7C.

However, in the first embodiment, in the later stage of deployment and inflation of the airbag 40, tension is applied to the tether 57, which extends across the boundary portion 56, through the deployment and inflation of the main bag member 41 as shown in FIG. 7B to cause a tense state of the tether 57. The main bag member 41 is thus unlikely to be subjected to decrease of tensile force caused by the communicating portions 59.

Particularly, as shown in FIG. 4, since the strips 58, which configure the tether 57, extend radially from the central section 56C of the boundary portion 56, a variation of the tensile force of the main bag member 41 in the circumferential direction is decreased.

The main bag member 41 produces greater reactive force than the airbag apparatus of the comparative example shown in FIG. 7C, which lacks the tether 57. As a result, even when the auxiliary bag member 51 is greatly deformed by the load applied from the head PH, the head PH is restrained by the main bag member 41. The protection performance of the airbag 40 for the head PH is thus improved.

Also, as has been described, the head PH of the occupant P1 is restrained at an earlier time than the thorax PT. Therefore, unlike a case in which the airbag 40 is configured simply by the main bag member 41 without the auxiliary bag member 51, intense pressing of the thorax PT by the airbag 40 at an earlier time than that of the head PH is unlikely to happen. As a result, the thorax PT is pressed by the main bag member 41 with appropriate pressing force and is thus protected from impact.

In addition to the ones listed above, the first embodiment achieves the following advantages.

In FIGS. 4 and 5, the tether 57 may be configured by a component separate from the rear main panel 46. However, this necessitates the work of joining the tether 57 to the rear main panel 46. In contrast, the tether 57 of the first embodiment is formed integrally with the rear main panel 46 and the aforementioned work for the joining is unnecessary. The communicating portions 59 and the tether 57 are formed simultaneously by punching out corresponding sections of the rear main panel 46. This decreases the number of steps of manufacturing the airbag 40, thus improving the productivity.

In FIGS. 4 and 5, the auxiliary bag member 51 may be configured simply by the disk-like rear auxiliary panel 54. In this case, the outer peripheral portion of the auxiliary bag member 51 is joined to the section of the rear main panel 46 that surrounds all the communicating portions 59. This allows the rear auxiliary panel 54 as a whole to be deployed and inflated into a semispherical shape. Since the rear auxiliary panel 54 is deployed and inflated in a curved manner, the projecting amount of the auxiliary bag member 51 from the main bag member 41 is decreased. This delays the time at which the auxiliary bag member 51 comes into contact with and restrains the head PH of the occupant P1.

However, in the first embodiment, the annular front auxiliary panel 52 is arranged between the rear main panel 46 and the rear auxiliary panel 54. The front auxiliary panel 52 is deployed and inflated substantially into a cylindrical shape. This increases the projecting amount of the auxiliary bag member 51 from the main bag member 41 and thus advances the time at which the auxiliary bag member 51 comes into contact with the head PH of the occupant P1 compared to a case without the front auxiliary panel 52. As a result, the head PH of the occupant P1 is restrained and protected from impact at a further advanced time.

Second Embodiment

An airbag apparatus for a vehicle driver's seat according to a second embodiment will now be described with reference to FIGS. 8 to 12B.

Figure 11:
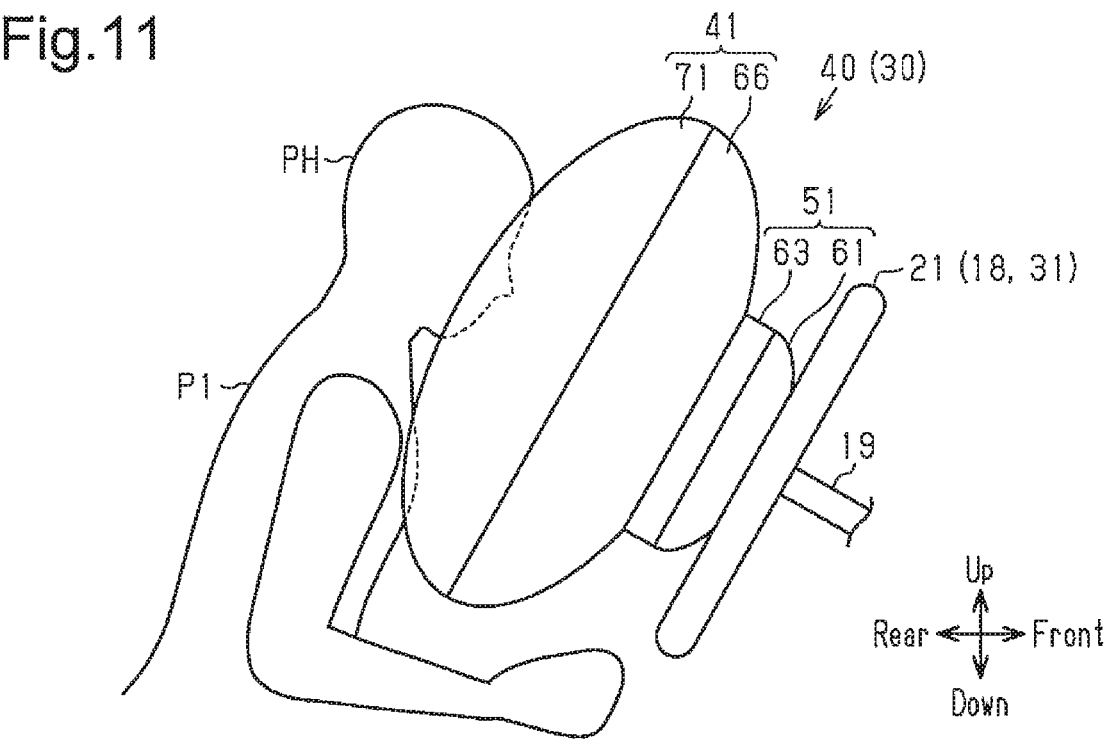
FIG. 11 is a schematic side view illustrating a manner in which an occupant is restrained by the airbag of the second embodiment.

As shown in FIG. 11, an airbag 40 of the second embodiment includes a main bag member 41 and an auxiliary bag member 51, which has a smaller volume than the main bag member 41. The auxiliary bag member 51 projects forward from the main bag member 41 and is attached to the steering wheel 18 (the bag holder 31). In this regard, the second embodiment is different from the first embodiment, in which the auxiliary bag member 51 projects rearward from the main bag member 41 that is attached to the steering wheel 18 (the bag holder 31).

Figure 9:
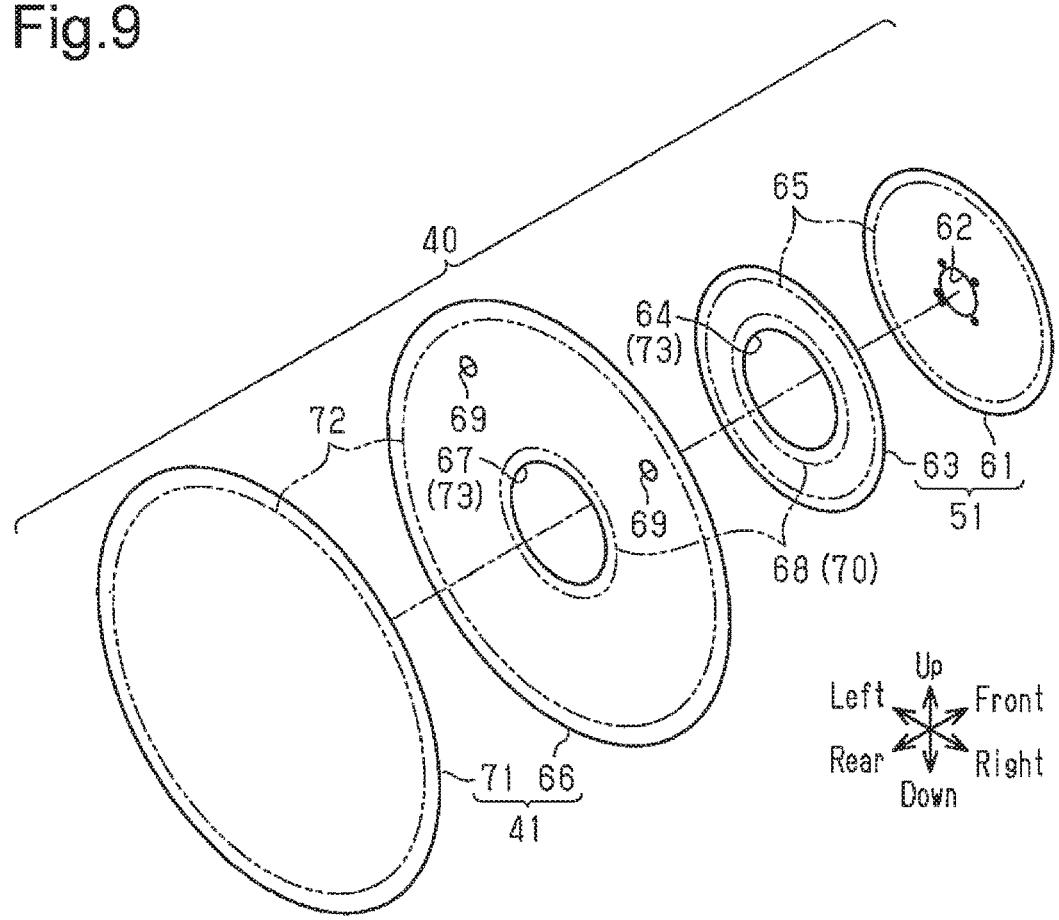
FIG. 9 is an exploded perspective view showing components of the airbag of the second embodiment.
Figure 10:
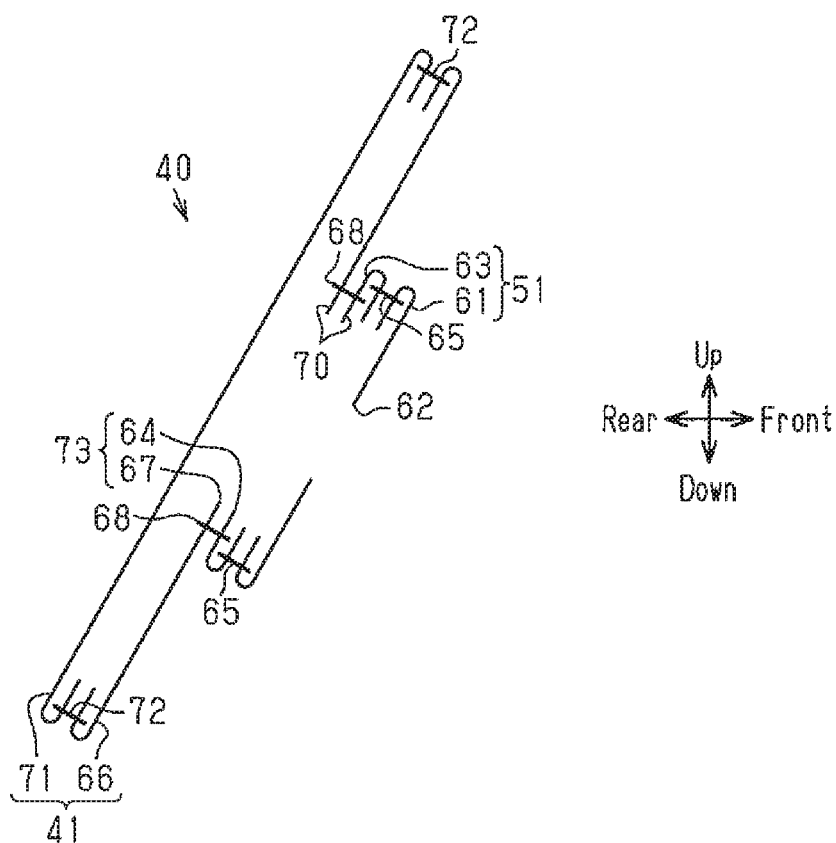
FIG. 10 is a cross-sectional view showing the airbag of the second embodiment.

More specifically, as shown in FIGS. 9 and 10, the auxiliary bag member 51 includes a front auxiliary panel 61 and a rear auxiliary panel 63. The front auxiliary panel 61 substantially has a disk-like shape. A circular insertion hole 62 is formed in the central section of the front auxiliary panel 61. Like the first embodiment, the inflator 35 is inserted through the insertion hole 62. Using fasteners such as bolts and nuts, the front auxiliary panel 61 and the inflator 35 are fastened to the steering wheel 18 (the bag holder 31). This attaches the front auxiliary panel 61, together with the inflator 35, to the steering wheel 18 (the bag holder 31).

The rear auxiliary panel 63 has a circular hole 64 and is formed into an annular shape. The rear auxiliary panel 63 has an outer diameter substantially equal to the outer diameter of the front auxiliary panel 61 and is arranged on the rear side of the front auxiliary panel 61. The rear auxiliary panel 63 is joined to the outer peripheral portion of the front auxiliary panel 61 by the peripheral edge joint portion 65, which is arranged along the outer peripheral portion of the rear auxiliary panel 63. Such joining is carried out such that the joined section (the sewn section) is located inside the auxiliary bag member 51.

The main bag member 41 includes a front main panel 66 and a rear main panel 71. The front main panel 66 has a circular hole 67, which has an inner diameter that is substantially equal to the inner diameter of the hole 64 of the rear auxiliary panel 63, and is formed into an annular shape. The front main panel 66 is arranged on the rear side of the rear auxiliary panel 63. The front main panel 66 is joined to the section of the rear auxiliary panel 63 around the hole 64 by the peripheral edge joint portion 68, which is arranged around the hole 67. The joining by the peripheral edge joint portions 65, 68 is carried out on the same surface of the rear auxiliary panel 63 with the rear auxiliary panel 63 stacked on the front auxiliary panel 61 and the front main panel 66. Also, the joining by the peripheral edge joint portion 68 is carried out such that the joined section (the sewn section) is located inside the airbag 40. The area on the rear auxiliary panel 63 and the area on the front main panel 66 that are surrounded by the peripheral edge joint portion 68 configure a boundary portion 70 between the main bag member 41 and the auxiliary bag member 51. The front main panel 66 has vent holes 69, through which excess inflation gas is discharged to the exterior of the airbag 40 after the airbag 40 is fully deployed and inflated.

The rear main panel 71 is formed into a disk-like shape that has an outer diameter substantially equal to the outer diameter of the front main panel 66 and is arranged on the rear side of the front main panel 66. The front main panel 66 and the rear main panel 71 are joined to each other by the peripheral edge joint portion 72, which is arranged along the outer peripheral portion of the front main panel 66 and the outer peripheral portion of the rear main panel 71. Such joining is carried out such that the joined section (the sewn section) is located inside the main bag member 41.

A communicating portion 73, which allows communication between the auxiliary bag member 51 and the main bag member 41, is formed in the boundary portion 70. The communicating portion 73 is configured by the hole 64 of the rear auxiliary panel 63 and the hole 67 of the front main panel 66. Unlike the first embodiment, the second embodiment lacks a tether.

Like or the same reference numerals are given to those components that are like or the same as the corresponding components described above in the first embodiment and detailed explanations are omitted.

The operation and advantages of the airbag apparatus 30 for a driver's seat according to the second embodiment, which is configured as described above, will now be described.

When an impact is applied to the front section of the vehicle 10 from diagonally forward left as represented by the long dashed double-short dashed arrow in FIG. 1, the bodies of the occupants P1, P2 act to lean diagonally forward left due to the inertia.

Meanwhile, in the airbag apparatus 30 for a driver's seat, as shown in FIG. 11, inflation gas is supplied to the auxiliary bag member 51 in response to the aforementioned impact. The auxiliary bag member 51 is thus deployed and inflated rearward. Some of the inflation gas that has been supplied to the auxiliary bag member 51 passes through the communicating portion 73 and is supplied to the main bag member 41. This deploys and inflates the main bag member 41 rearward with a delay with respect to the auxiliary bag member 51.

As shown in FIG. 11, in the airbag 40 of the second embodiment, the auxiliary bag member 51, which has a smaller volume than the main bag member 41, projects forward from the main bag member 41. The airbag 40 is attached to the steering wheel 18 (the bag holder 31) at the auxiliary bag member 51. Space is formed around the auxiliary bag member 51 and between the attachment position of the auxiliary bag member 51 and the main bag member 41. This allows the airbag 40 to swing in the space about the auxiliary bag member 51 serving as the point of support.

Specifically, if the airbag 40 is configured simply by the main bag member 41 and is attached to the steering wheel 18 (the bag holder 31) as in the case of the comparative example shown in FIG. 12B, the aforementioned swinging motion is unlikely to happen. That is, since the outer diameter of the airbag 40 is greater than the outer diameter of the auxiliary bag member 51, the aforementioned space is unlikely to be formed. When coming into contact with the airbag 40, the head PH of the occupant P1, which acts to lean diagonally forward left, acts to rotate in the direction represented by arrow A about the neck serving as the axis as viewed from above. This is because, despite the fact that the airbag 40 does not or substantially does not pivot, the upper half of the body of the occupant P1 acts to lean in the direction represented by arrow B (diagonally forward left). In protecting the occupant P1, such rotation of the head PH is undesirable from the viewpoint of the human body structure.

However, in the second embodiment, as shown in FIG. 12A, when the head PH of the occupant P1, which acts to lean diagonally forward left, comes into contact with the main bag member 41 of the airbag 40 as represented by arrow C, the airbag 40 swings in the direction represented by arrow D about the auxiliary bag member 51, which is attached to the steering wheel 18, serving as the point of support. Such swinging motion allows the head PH to move diagonally forward left without rotating about the neck serving as the axis. The protection performance of the airbag 40 for the head PH is thus improved.

In addition to the ones listed above, the second embodiment achieves the following advantages.

In FIGS. 9 and 10, the auxiliary bag member 51 may be configured simply by the disk-like front auxiliary panel 61. In this case, the outer peripheral portion of the auxiliary bag member 51 is joined to the section of the front main panel 66 that surrounds the hole 67. This allows the front auxiliary panel 61 as a whole to be deployed and inflated into a semispherical shape. The projecting amount of the auxiliary bag member 51 from the main bag member 41 is thus decreased. This correspondingly delays the time at which the main bag member 41 comes into contact with and restrains the occupant P1.

However, in the second embodiment, the annular rear auxiliary panel 63 is arranged between the front auxiliary panel 61 and the front main panel 66. The rear auxiliary panel 63 is deployed and inflated substantially into a cylindrical shape. This increases the projecting amount of the auxiliary bag member 51 from the main bag member 41 and advances the time at which the rear surface of the main bag member 41 comes into contact with the occupant P1 compared to a case without the rear auxiliary panel 63. As a result, the occupant P1 is restrained and protected from the impact at a further advanced time.

The above embodiments may be modified as follows.

Modifications Common to First and Second Embodiments

The shape of the auxiliary bag member 51 in the deployed and inflated state may be changed to any shape other than a semispherical shape.

Figure 13A:
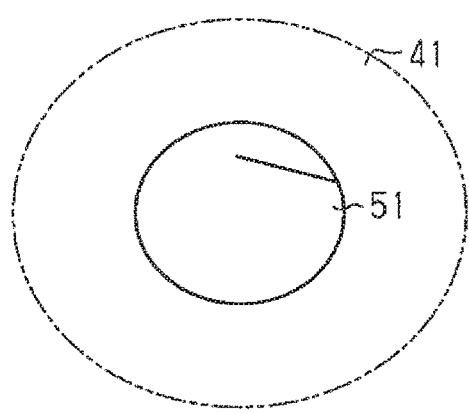
FIGS. 13A to 13E are partial perspective views showing auxiliary bag members of modifications.

FIG. 13A shows a modification in which the auxiliary bag member 51 has a diameter that becomes smaller as the distance from the main bag member 41 increases. The auxiliary bag member 51 is deployed and inflated into a conical shape, which has a pointed vertex.

Figure 13B:
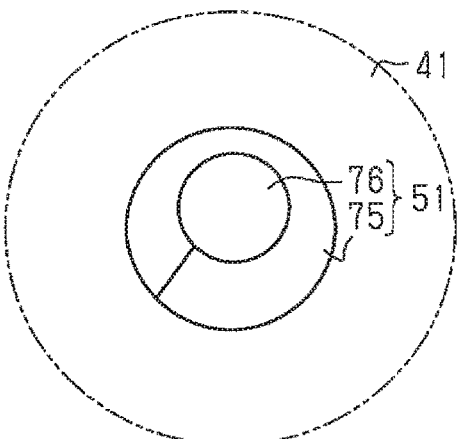

FIG. 13B illustrates a modification in which the auxiliary bag member 51 has a diameter that becomes smaller as the distance from the main bag member 41 increases. The auxiliary bag member 51 is deployed and inflated into a truncated conical shape, which has a circular top surface at the distal end. If such modification is employed in the second embodiment, the insertion hole 62 is formed in the auxiliary bag member 51.

The auxiliary bag member 51 may be configured by multiple fabric panels.

In the modification of FIG. 13B, the auxiliary bag member 51 is formed into the truncated conical shape having the diameter that becomes smaller as the distance from the main bag member 41 increases by using two fabric panels that have different shapes. The two fabric panels are a fabric panel 75, which configures the tapered surface, and a fabric panel 76, which configures the circular top surface.

Figure 13C:
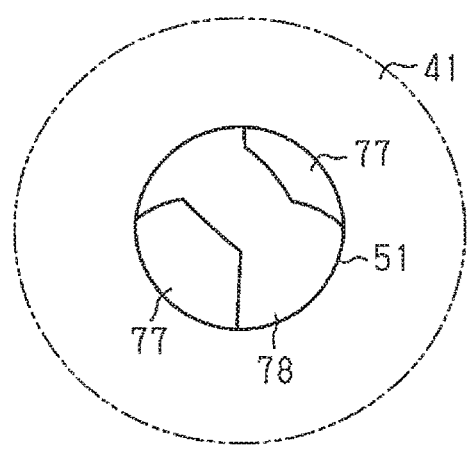

FIG. 13C shows a modification in which the auxiliary bag member 51 is formed into a semispherical shape using three fabric panels. In this case, two types of fabric panels 77, 78, each type having a different shape, are employed. The two fabric panels 77 are arranged on the opposite sides of the fabric panel 78.

Figure 13D:
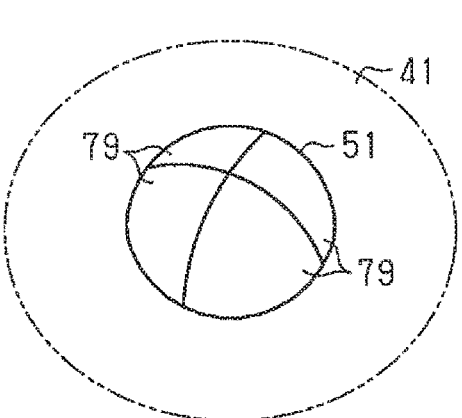

FIG. 13D shows a modification in which the auxiliary bag member 51 is formed into a semispherical shape using four fabric panels 79, which have the same shape.

Figure 13E:
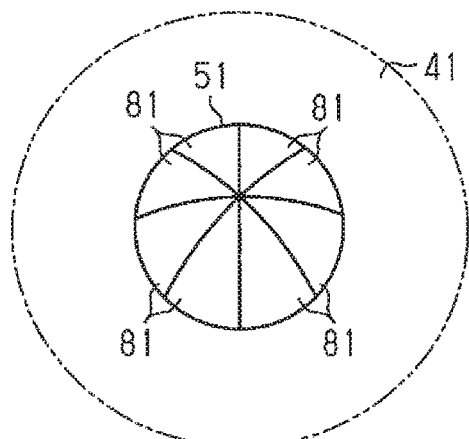

FIG. 13E shows a modification in which the auxiliary bag member 51 is formed into a semispherical shape using eight fabric panels 81, which have the same shape.

If such modifications are used in the second embodiment, an insertion hole 62 is formed in the auxiliary bag member 51.

The shape of the main bag member 41 and the shape of the auxiliary bag member 51 at the time the airbag 40 is deployed and inflated may each be changed to any shape different from the corresponding shape of either the first embodiment or the second embodiment.

Modifications Only Applicable to First Embodiment

In the first embodiment, the tether 57 may be formed by a fabric panel that is separate from the rear main panel 46.

The shape of the tether 57 may be changed.

FIGS. 14A to 14D each show a modification of the tether 57 that has strips 58 that extend radially from the central section 56C of the boundary portion 56.

Figure 14A:
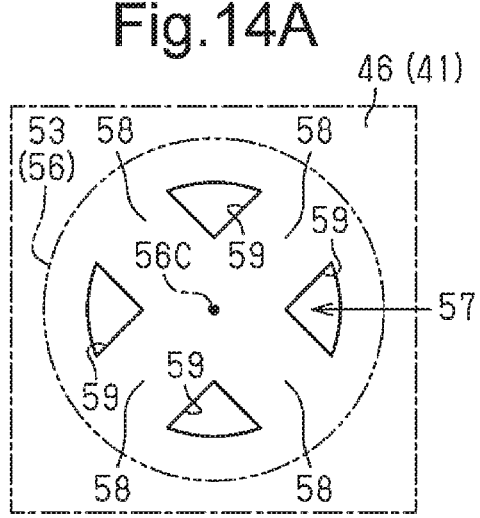
FIGS. 14A to 14D are partial front views showing tethers and communicating portions of modifications.

In FIG. 14A, four strips 58 are spaced apart at equal angles (90°) about the central section 56C. This case is different from the first embodiment in that the strips 58 are inclined with respect to the up-down direction and the left-right direction.

Figure 14B:
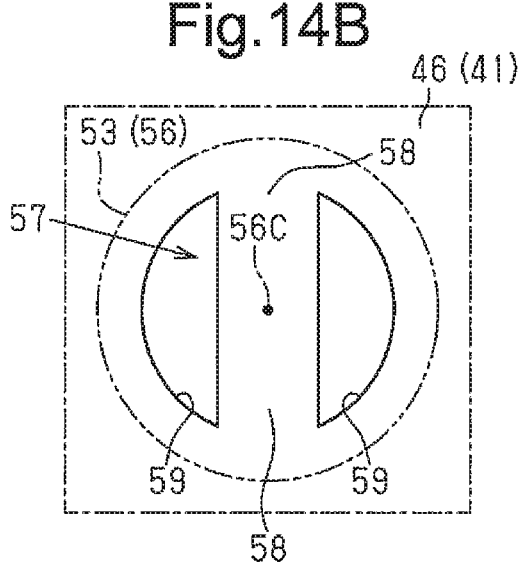
Figure 14C:
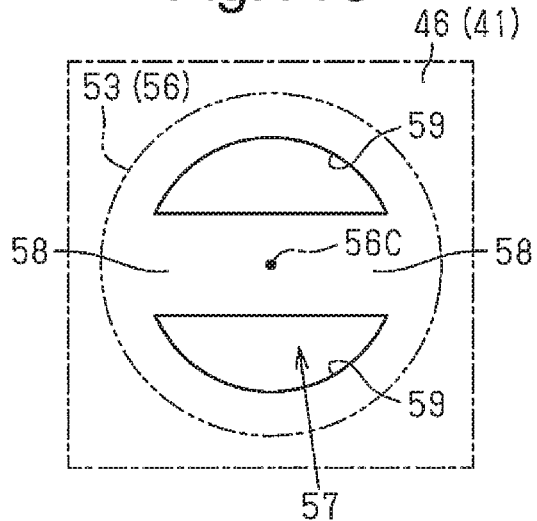

FIGS. 14B and 14C each show a modification in which two strips 58, which configure the tether 57, extend in the opposite directions from the central section 56C.

In FIG. 14B, the two strips 58 extend in the up-down direction. The communicating portions 59 are formed on the opposite sides in the left-right direction of the tether 57. In FIG. 14C, the two strips 58 extend in the left-right direction. The communicating portions 59 are formed on the opposite sides in the up-down direction of the tether 57.

Figure 14D:
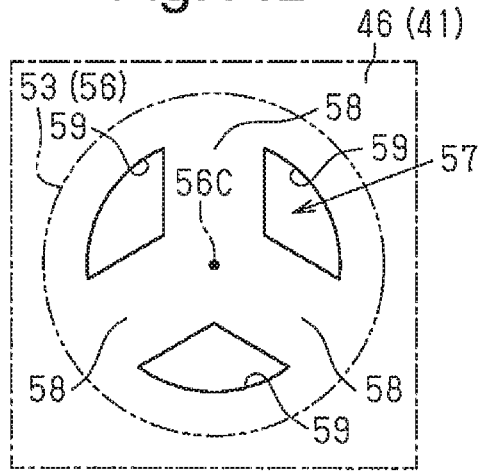

In FIG. 14D, three strips 58 are spaced apart at equal angles (120°) about the central section 56C and extend radially.

The auxiliary bag member 51 may be configured simply by the rear auxiliary panel 54, without using the front auxiliary panel 52.

Modifications Only Applicable to Second Embodiment

The shape of the communicating portion 73 may be changed to any shape other than the circular shape.

The auxiliary bag member 51 may be configured simply by the front auxiliary panel 61, without using the rear auxiliary panel 63.

Another Modification

The above-described airbag apparatuses are not restricted to airbag apparatuses for a driver's seat. The airbag apparatuses may be employed as airbag apparatuses for a front passenger seat or a rear seat.

The invention claimed is:

1. An airbag apparatus comprising:
an airbag; and
an inflator, which supplies inflation gas to the airbag in response to an impact applied to a front section of a vehicle, wherein
the airbag is configured to be deployed and inflated by the inflation gas at a position forward of a vehicle seat,
the airbag includes
a main bag member, which is configured to be attached to a base member located at a position forward of the vehicle seat in the vehicle, wherein the inflation gas is supplied from the inflator to the main bag member,
an auxiliary bag member, which has a smaller volume than the main bag member and projects rearward from the main bag member, and
a tether, which extends across a boundary portion between the main bag member and the auxiliary bag member,
a communicating portion, which allows communication between the main bag member and the auxiliary bag member, is provided around the tether in the boundary portion,
the main bag member includes
a front main panel, which is configured to be attached to the base member; and
a rear main panel, which is arranged on a rear side of the front main panel and is joined to an outer peripheral portion of the front main panel at an outer peripheral portion of the rear main panel, and
the tether and the communicating portion are arranged in the rear main panel.

2. The airbag apparatus according to claim 1, wherein the tether is formed integrally with the rear main panel.

3. The airbag apparatus according to claim 2, wherein the auxiliary bag member includes
an annular front auxiliary panel, which is arranged on a rear side of the rear main panel and is joined to the rear main panel at an inner peripheral portion of the front auxiliary panel, and
a rear auxiliary panel, which is arranged on a rear side of the front auxiliary panel and is joined to an outer peripheral portion of the front auxiliary panel at an outer peripheral portion of the rear auxiliary panel.

4. The airbag apparatus according to claim 3, wherein the tether includes a plurality of strips, which extends radially from a central section of the boundary portion between the main bag member and the auxiliary bag member.

\* \* \* \* \*